United States Patent [19]

Marsh

[11] Patent Number: 4,625,850
[45] Date of Patent: Dec. 2, 1986

[54] PRESS CLUTCH CONTROL SYSTEM

[75] Inventor: Eugene M. Marsh, Crestwood, Ill.

[73] Assignee: Verson Allsteel Press Co., Chicago, Ill.

[21] Appl. No.: 473,570

[22] Filed: Mar. 9, 1983

[51] Int. Cl.[4] ............................ F16D 11/04; B21J 9/20
[52] U.S. Cl. ............................... 192/143; 192/147
[58] Field of Search ............... 192/147, 146, 144, 143, 192/142 R, 140, 139, 138, 94, 12 R, 18 A; 74/866, 869, 731

[56] References Cited

U.S. PATENT DOCUMENTS

| | | | |
|---|---|---|---|
| 2,816,635 | 12/1957 | Dany et al. | 192/12 D |
| 3,227,255 | 1/1966 | Heiberger | 192/142 |
| 3,268,047 | 8/1966 | Grygera et al. | 192/144 |
| 3,628,357 | 12/1971 | Luenser | 72/6 |
| 3,666,965 | 5/1972 | Luenser | 307/112 |
| 3,730,313 | 5/1973 | Luenser | 192/12 C |
| 3,889,503 | 6/1975 | Luenser | 72/6 |
| 3,931,727 | 1/1976 | Luenser | 72/444 |
| 4,048,886 | 9/1977 | Zettler | 192/144 |
| 4,161,649 | 7/1979 | Klos et al. | 192/144 |
| 4,211,098 | 7/1980 | Luenser | 72/21 |
| 4,246,523 | 1/1981 | Nagai | 192/140 |

Primary Examiner—George H. Krizmanich
Attorney, Agent, or Firm—Richards, Harris, Medlock & Andrews

[57] ABSTRACT

A press machine (10) having a slide (18) operable by a clutch controlled rotatable drive system (24, 26, 30, 34) is provided. The press (10) includes a sensor (42) interconnected into the drive system (34) for sensing the rotation of the drive system (34). A timer (64) is provided for generating an elapsed time signal representing the amount of time for the drive system (34) to rotate from a first angular position to a second angular position. Circuitry (64) is provided for comparing the elapsed time signal with a predetermined magnitude to thereby generate a signal representing the speed of the press (10). Circuitry (64) is further provided which is responsive to the speed signal for generating a control signal. The control signal is appolied to the clutch solenoid (40) for deactuating the clutch (24) to thereby enable stoppage of the press at a predetermined position at the top of the slide's (18) cycle.

5 Claims, 4 Drawing Figures

4,625,850

PRESS CLUTCH CONTROL SYSTEM

BACKGROUND ART

Press machines are used to punch or shape material. These press machines are power components which are fitted with dies. One portion of the die is attached to a stationary bed of the machine. The second portion of the die is attached to a slide which reciprocates to open and close the die to perform the desired operation on the material. The portions of the die are closed to shape the material and the die portions are opened to insert and remove the material. Inserting and removing the material can be accomplished by machines or performed manually.

It is desirable to control the press clutch such that the slide will repeatedly stop at the top of the stroke at approximately the same position. As the press brake wears, the stopping time for the slide will increase and the slide will not stop until it is moved past the top of the stroke and begins to move downward toward the work area.

Systems have been heretofore proposed wherein the position of the brake at its stopped position is detected and the distance required for stopping, is measured. Such a system is described in U.S. Pat. No. 3,931,727 issued to Luenser on Jan. 13, 1976 and entitled "Method in a Metal Forming Machine". However, on machines which have a variable speed of operation it is desirable to adjust the point of slide position at which the stopping action is initiated, in order to compensate for the inherent change in stopping distance resulting from the change in speed of operation.

Other related aspects of press machines involve the monitoring of clutch valves. For reliable clutch and brake action, double safety valves are used. The operation of these valves are monitored either pneumatically or electrically. In the operation of clutch valves there should be no significant increase in stopping time resulting from the failure of one section of the valve. It is desirable that when such a failure occurs that the press machine be stopped and prevented from being operated until correction of the clutch valve is made. It is therefore desirable to excercise the valve monitor frequently to determine if the monitor is viable and functional. Further, automatic monitoring is desirable.

It is further desirable to limit the single stroking rate of clutch and brake actuations of press machines to limit brake lining temperatures to preestablished limits.

A need has thus arisen for a press clutch control system having improved reliability aspects. A need has arisen for causing the press slide to stop at the top of the slide's cycle for variable speed presses. A need has further arisen for an improved clutch valve monitor test system as well as a monitoring system for brake operation within the thermal limit of the brake.

DISCLOSURE OF THE INVENTION

In accordance with the present invention, a press clutch control system is provided which enhances the operation of the press and improves the ability to monitor press functions.

In accordance with the present invention, a press machine having a slide operable by a clutch controlled rotatable drive system is provided. The press includes a sensor interconnected to the drive system for sensing the rotation of the drive system. A time is provided for generating an elapsed time signal representing the amount of time for the drive system to rotate from a first angular position to a second angular position. Circuitry is provided for comparing the elapsed time signal with a predetermined magnitude to thereby generate a signal representing the speed of the press. Circuitry is further provided which is responsive to the speed signal for generating a control signal. The control signal is applied to the clutch valve for deactuating the clutch to thereby enable stoppage of the slide at a predetermined position at the top of the stroke.

In accordance with another aspect of the present invention, a press having a clutch controlled rotatable drive system is provided. The clutch includes a plurality of solenoid valves and a monitor for sensing an imbalance in the operation of the valves. Circuitry is provided for automatically testing the monitor upon initial actuation of the press.

In accordance with yet another aspect of the present invention, a press machine having a slide operable between a top and bottom position in a repetitive stroke operation is provided. A timer is provided which is actuated when the slide is in the bottom position. Circuitry is provided for controlling actuation of the press in the slide top position to prevent operation of the press until a sufficient time has elapsed between press strokes.

BRIEF DESCRIPTION OF THE DRAWINGS

For a more complete understanding of the present invention and for further advantages thereof, reference will now be made to the following detailed description taken in conjunction with the accompanying drawings in which.

DETAILED DESCRIPTION

Figure 1:
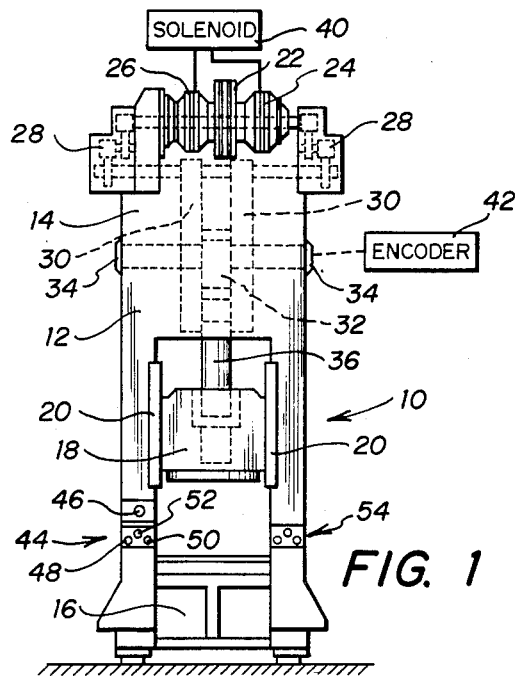
FIG. 1 is a diagrammatic illustration of a typical press machine utilized in conjunction with the present invention.

Referring to FIG. 1, a typical press is illustrated and is referred to generally by the numeral 10. Press 10 may comprise, for example, a press of the type described in U.S. Pat. No. 2,286,943, and it will be understood that press 10 is merely exemplary of any type of machine having a work producing member which is movable by a rotative drive and which is stopped by a brake.

Press 10 includes a frame 12 having a crown 14 and a bed 16. A reciprocal slide 18 is vertically movable within gibs 20. Mounted on crown 14, a motor (not shown) drives a flywheel 22 in a well-known manner. Flywheel 22 is connected through a clutch 24, a brake assembly 26 and suitable gearing 28 to a pair of gears 30. Gears 30 drive an eccentric 32 mounted for rotation on a gear shaft 34. Eccentric 32 operates a pitman 36 which is interconnected to slide 18.

Associated with clutch 24 and brake assembly 26 is a solenoid 40, which may comprise, for example, a dual clutch solenoid which includes a pair of solenoid operated valves 40c and a separate solenoid coil 40a associated with each valve to operate the valves independently. One such dual clutch solenoid is a Crossflow SERPAR double valve with an electropneumatic monitor manufactured and sold by Ross Operating Valve Company of Detroit, Mich. Model No. 3573A6111. Solenoid 40 is operable for controlling operation of clutch 24 and brake assembly 26.

Associated with gear shaft 34 is an encoder 42. Encoder 42 may comprise, for example, an absolute position encoder manufactured and sold by Autotech Corporation of Addison, Ill. as model EN359-PA. Encoder 42 provides a unique binary coded decimal output signal for each degree of shaft position of gear shaft 34.

Clutch 24 and brake assembly 26 may be either of a hydraulic or pneumatic type. The supply of fluid applied thereto is under the control of solenoid 40.

Frame 12 further includes a master control station 44 which includes a manually operable function control switch 46 which is movable to a number of different active stable positions such as, for example, off, single inch and continuous stroke positions. Run buttons 48 and 50 are provided which must be concurrently depressed by the operator to cause operation of slide 18. A stop button 52 may be depressed by the operator in order to generate an electrical signal to energize brake assembly 26 in order to stop the movement of slide 18. A similar operator control station 54 is provided to enable operation of press 10 by two operators. For a more detailed description of the construction and operation of the control system for press 10, reference is made to U.S. Pat. Nos. 3,666,965 and 3,628,357.

Figure 2:
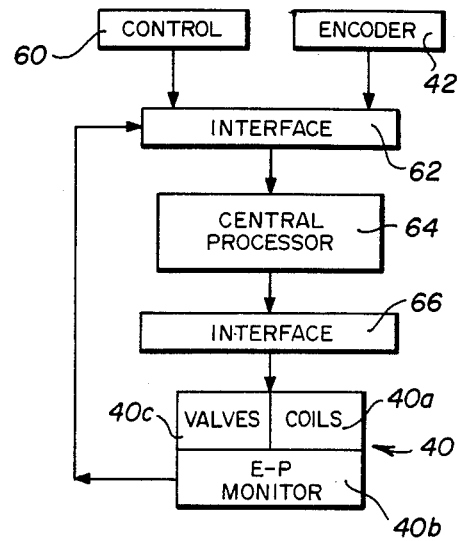
FIG. 2 is a block diagram of the present clutch control system.

Referring now to FIG. 2, the operation of the present clutch control system will now be described. The present clutch control system functions to determine the speed of press 10 to generate a signal to solenoid 40 in order to disengage the clutch 24 and engage brake assembly 26 so that slide 18 will stop at the top of its cycle. In this manner, regardless of the speed of press 10, the present clutch control system will enable slide 18 to repeatedly stop near the top of its stroke.

Control circuitry 60 includes run buttons 48 and 50 and provides an input to interface circuitry 62. Interface circuitry 62 also receives the output of encoder 42. Interface circuitry 62 provides an interface to a central processor 64. Central processor 64 may comprise, for example, a programmable control central processor manufactured and sold by Allen-Bradley Company of Highland Heights, Ohio as model 1774 RP3. Central processor 64 functions to generate a control signal which is applied to an interface 66 whose output is applied to solenoid 40. As previously stated, the output of solenoid 40 de-energizes clutch 24 in order for slide 18 to stop at the top of its stroke.

Figure 3:
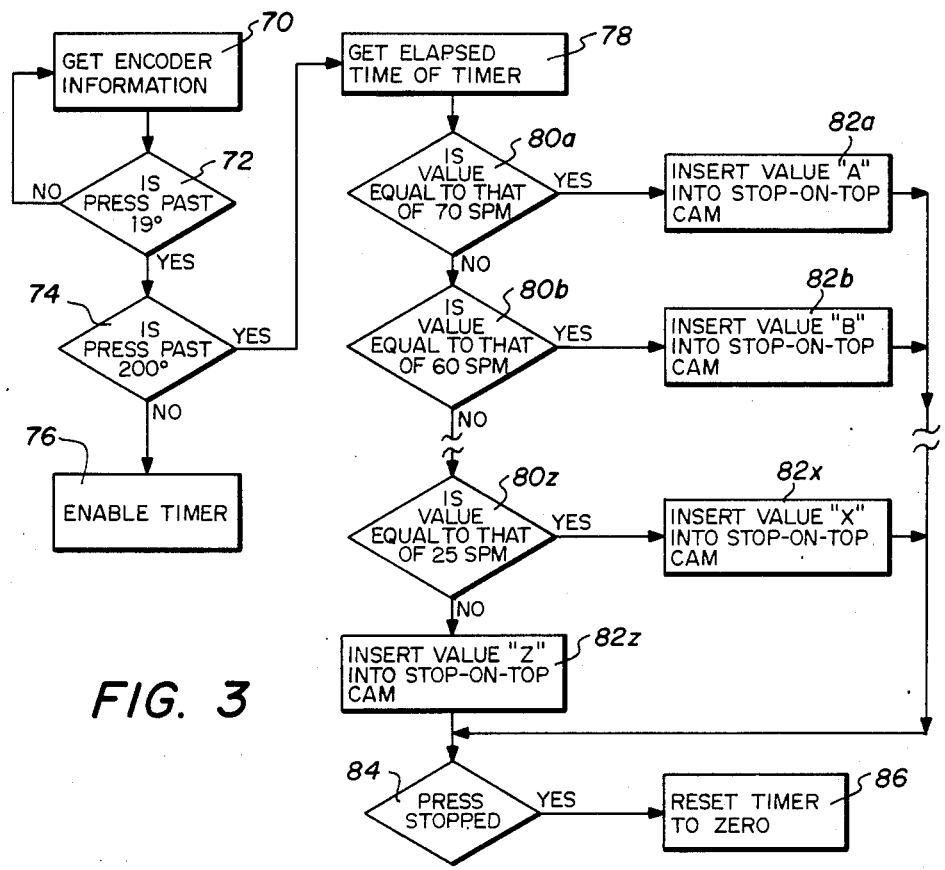
FIG. 3 is a computer flow diagram of one aspect of the present clutch control system and FIG. 4 is a block diagram illustrating the interrelation between the solenoid valves, coils, valve monitor, clutch and central processor.

FIG. 3 is a computer flow diagram to illustrate the process steps perfomed by central processor 64 to generate the control signal which is applied to solenoid 40. During the downstroke of slide 18, encoder 42 provides a signal at block 70. The output of encoder 42 is compared at decision blocks 72 and 74 to determine whether gear shaft 34 has rotated between, for example, 20° and 200° of rotation. This rotation range is selected to provide a range over which the speed of slide 18 will be relatively constant. When the program of central processor 64 determines, by the comparisons made at decision blocks 72 and 74, that a press is between 20° and 200° of rotation, a timer is enabled at block 76. When the angular position of gear shaft 34 has reached 200°, the timer of block 76 is disabled. It therefore can be seen that the timer within central processor 64, block 76, is enabled only when encoder 42 is operable and only if gear shaft 34 has rotated past 20° but not past 200° of rotation.

When gear shaft 34 has rotated past 200°, the output of the timer within central processor 64 is obtained at block 78 which represents the duration that the timer has been enabled between 20° and 200° of rotation of gear shaft 34. The elapsed time of the timer will be less if slide 18 is moving at a fast stroke per minute rate and, accordingly, greater if the press speed is slow.

The elapsed time of the timer is compared to a list of fixed values of magnitudes within central processor 64. The fixed values are the elapsed time for specific press speeds. This comparison is made at decision blocks 80a–80z. If the elapsed time is equal to the fixed value of, for example, 70 strokes per minute, the yes decision path from decision block 80a is taken such that a fixed value is obtained from central processor 64 at block 82a to de-energize clutch 24, so that slide 18 will stop at the top of its stroke. The inserted value from blocks 82a–82z is the degree on the press stroke in which to initiate the de-energization of clutch 24. When slide 18 reaches this point in its stroke, as decoded from encoder 42, clutch 24 is de-energized.

A determination is made at decision block 84 as to whether press 10 is stopped. This determination is made by central processor 64 monitoring the output of encoder 42. If the output of encoder 42 has terminated, the timer of central processor 64 is reset to zero at block 86 in preparation for the next stroke of slide 18.

Figure 4:
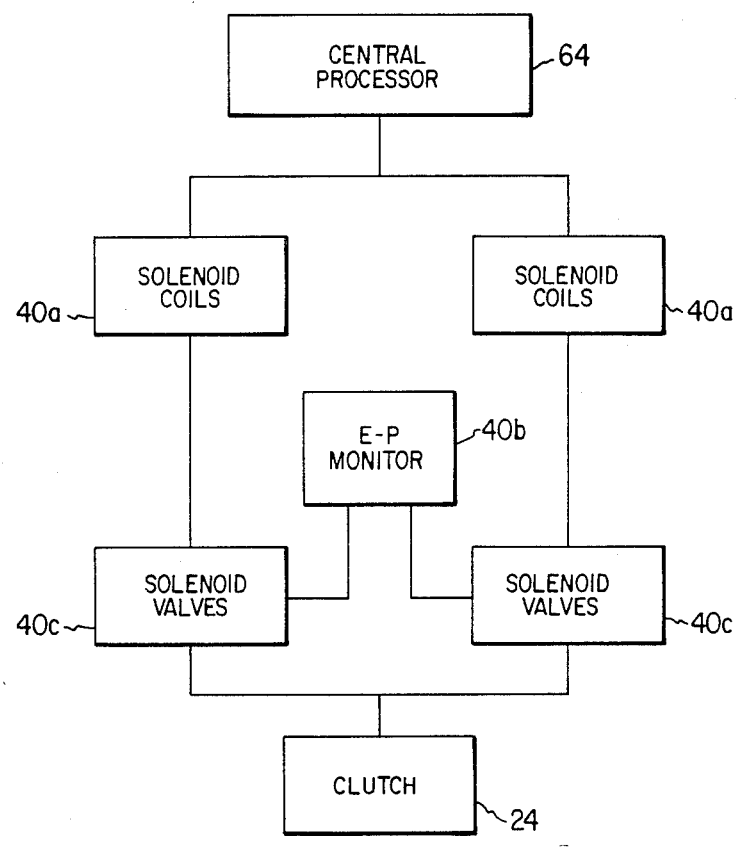

It therefore can be seen that the program of central processor 64 determines the speed of press 10, and generates a signal, based upon this determined speed, to solenoid 40 to disable clutch 24 as seen in FIGS. 2 and 4. Central processor 64 thereby functions to stop the stroke of slide 18 regardless of the speed of press 10 so that slide 18 repeatedly stops at the top of its press stroke.

Referring again to FIG. 2, additional aspects of the present invention will now be discussed. Solenoid 40 includes solenoid coils 40a and an electro-pneumatic (E-P) monitor 40b. E-P monitor 40b reacts to unbalanced monitoring pressure signals by breaking the electrical circuit of solenoid coils 40a to inhibit further operation of solenoid 40 until E-P monitor 40b is reset. Although E-P monitor 40b functions to monitor the operation of clutch valves, previously developed monitors have relied upon the operator of press 10, by manually cycling the monitor, to ensure that the E-P monitor was operating properly prior to a malfunction of solenoid 40.

The present invention permits the monitoring of E-P monitor 40b upon actuation of a control master start push button located in master control station 44. Control circuitry 60 generates a signal to central processor 64 which in turn will selectively actuate solenoid coils 40a. Each coil of solenoid coils 40a will be individually energized such that E-P monitor 40b should indicate a fault if E-P monitor 40b is properly operating. The output of E-P monitor 40b will be applied through interface circuitry 62 to central processor 64 which will, in turn, reset E-P monitor 40b for the paticular solenoid coil actuated of solenoid coils 40a. This procedure will be repeated for the second coil of solenoid coils 40a to determine if a fault signal will be generated by E-P monitor 40b. When E-P monitor 40b is reset for the second solenoid coil, central processor 64 will permit operation of press 10. During operation of press 10, if E-P monitor 40b indicates a fault, clutch 24 will be de-energized and further operation of press 10 prohibited.

An additional aspect of the present invention functions to limit the production rate of slide 18 to ensure that the thermal limit of the brake assembly 26 is not reached. When slide 18 reaches the bottom of its stroke, determined by the output of encoder 42 which is applied to central processor 64, a fixed time delay is initiated by central processor 64. Until this time delay has expired, reinitiation of clutch 24 in single mode is inhibited.

Therefore, it can be seen that the present clutch control system provides for a programmable controlled system for the control of a press clutch to enhance brake monitoring. The present invention by measuring the speed of the press slide enables the slide to stop near the top of the stroke regardless of the slide speed. The present invention further provides for a built-in delay between slide strokes to provide proper cooling time so that the brake will not reach its thermal limit of operation. The present invention further provides for an automatic testing circuit of the electro-penumatic monitor of the double solenoid valve.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. In a press machine including a press having a slide, the slide cycling between a top position and a bottom position, said slide operable by a clutch controlled rotatative drive system, a clutch control system comprising:
   sensing means interconnected to the drive system for sensing the rotation of the drive system;
   timing means responsive to said sensing means for generating an elapsed time signal representing the amount of time for the drive system to rotate from a first angular position to a second angular position;
   means for comparing said elapsed time signal with a predetermined magnitude to thereby generate a signal representing the speed of the press; and
   means responsive to said speed signal for generating a control signal limiting rotation of said drive system to a number of degrees functionally related to said speed signal and effective for deactuating the clutch to enable stoppage of the press at a consistent predetermined position at the top of the slide's cycle.

2. The press machine of claim 1 and further including:
   monitor means for monitoring the operation of the clutch; and
   means for testing said monitoring means.

3. The press machine of claim 1 and further including:
   means for delaying operation of the press between slide strokes.

4. In a press machine including a press, said press having a clutch controlled rotative drive system, a clutch control system including a press control for selectively operating the press, a plurality of solenoid operated valves, each of said solenoid operated valves being operable for actuating and deactuating a clutch in the clutch controlled rotative drive system, each of said solenoid operated valves including a solenoid coil for operating the solenoid operated valve and a monitor for sensing an imbalance in the operation of the solenoid valve and further comprising:
   means for automatically testing the monitor upon initial actuation of the press control.

5. A press machine including a press operable between a top position and a bottom position in a repetitive stroke cycle comprising:
   timer means actuated in response to the position of the press in the bottom position; and
   means responsive to said timer means for controlling actuation of the press in the top position to prevent operation of the press until a sufficient time has elapsed between press strokes.

* * * * *